March 2, 1965 — J. P. BERND — 3,171,563
ROCKET MOTOR CASE
Filed Oct. 2, 1961 — 2 Sheets-Sheet 1
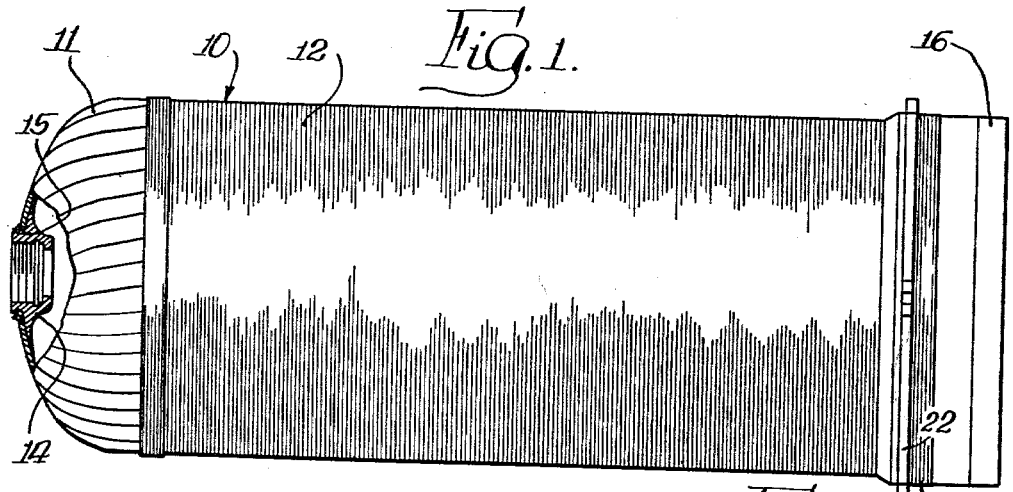
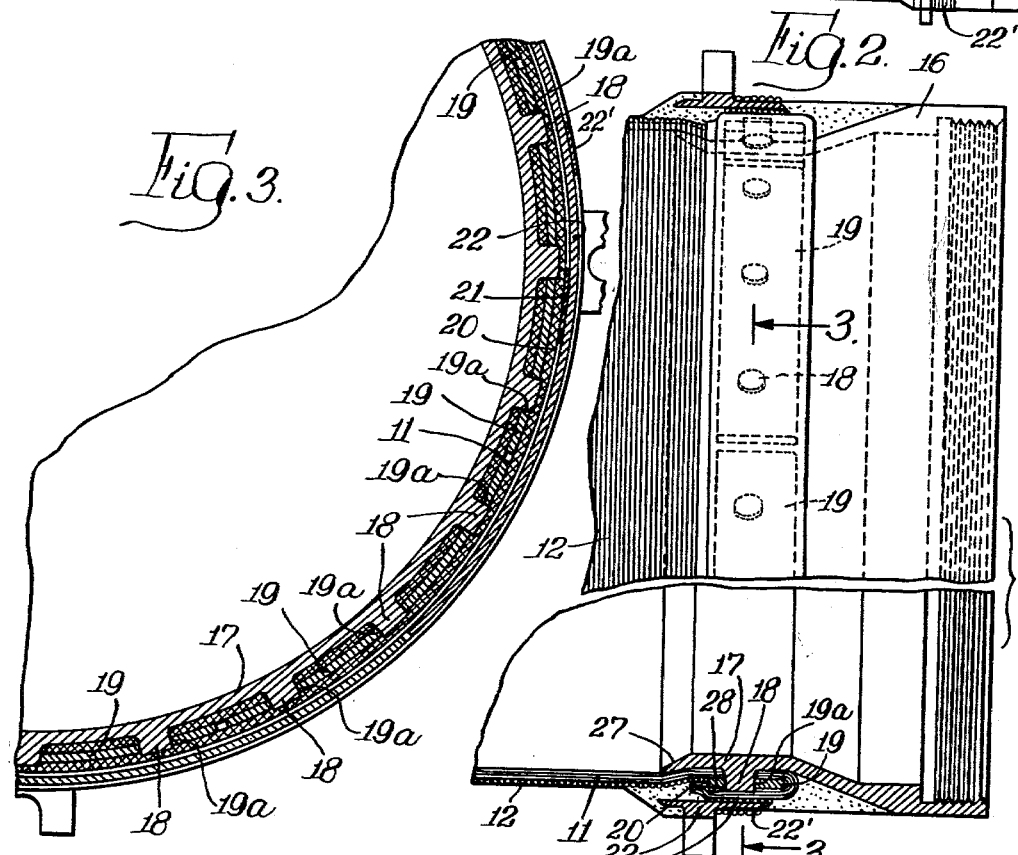
INVENTOR.
Jules P. Bernd March 2, 1965  J. P. BERND  3,171,563
ROCKET MOTOR CASE
Filed Oct. 2, 1961  2 Sheets-Sheet 2 ably rigidly interlocked with the fitting. The longitudinal filaments are cut and folded back over the annular member to form return portions of the longitudinal filaments. Circumferential filaments hold these return portions. In the preferred embodiment the annular member is in the form of a series of circumferentially extending segments defining a ring encasing the fitting and longitudinal filaments.

United States Patent Office 3,171,563
Patented Mar. 2, 1965

3,171,563
ROCKET MOTOR CASE
Jules P. Bernd, North Muskegon, Mich., assignor to Brunswick Corporation, a corporation of Delaware
Filed Oct. 2, 1961, Ser. No. 142,428
5 Claims. (Cl. 220—3)

This invention relates to a hollow article, and more particularly to the fabrication of a filament wound hollow article such as a rocket motor case.

A primary object of this invention is to provide a new and improved hollow article.

Another object is to provide a new and improved connection for a fitting in a filament wound hollow article. A related object is to provide such a connection in which load applied to the filaments is transmitted to an end fitting by tension stress of the filaments.

A more specific object is to provide a new and improved end fitting connection in a bi-axial filament wound rocket motor case. A related object is to provide such a connection in which longitudinally extending filaments are securely interlocked with the end fitting and are tensioned in transmitting their loads to the fittting.

Other objects and advantages will be readily apparent from the following detailed description taken in connection with the accompanying drawings, in which:

FIGURE 1 is a side view of a rocket motor case embodying features of the invention, with parts broken away for clearer illustration;

FIGURE 2 is an enlarged, fragmentary elevational view of a portion of the rocket motor case, with parts broken away and removed for clearer illustration;

FIGURE 3 is an enlarged, fragmentary vertical sectional view taken generally along the line 3—3 of FIGURE 2;

Figure 4:
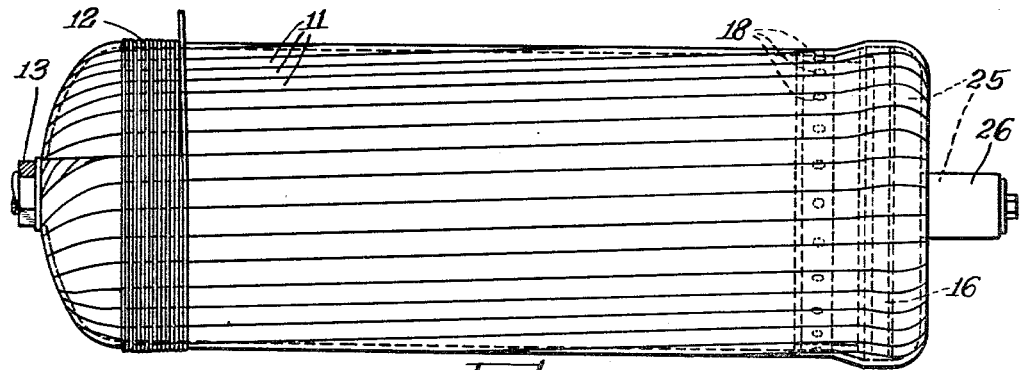
FIGURE 4 is a side view illustrating a step in the fabrication of the rocket motor case.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

The invention is, in brief, directed to the connection of a fitting in a filament wound hollow article, and more particularly to such a connection in a bi-axial filament wound rocket motor case. The connection is such that a load applied to the case is transmitted to the fitting substantially by tension stress in a portion of the filaments. In general, the case may be wound in any suitable or conventional manner for fabricating a wall of laminated layers of longitudinally and circumferentially extending filaments, as on a mandrel. In the preferred embodiment the fitting is suitably attached to an end of the mandrel and longitudinal filaments are wound around the mandrel and end fitting. An annular member is placed around the longitudinal filaments and the fitting, Referring to FIGURE 1 of the drawings, a rocket motor case is illustrated in the preferred embodiment in the form of a hollow, elongated generally cylindrical unit having a wall 10 defined by generally longitudinally extending inner filaments 11 and generally circumferentially extending outer filaments 12. These filaments may be of any suitable type, for example they may be glass fibers, and may have a suitable bonding agent applied thereto as they are wound about a removable mandrel 13, in keeping with suitable techniques of the art. A front end fitting 14 may be of any suitable type, and in the illustrated embodiment has an undercut portion 15 at its front end for holding the longitudinal filaments 11 as they are wound on the mandrel. A rear end nozzle attachment fitting 16 provides an open rear end of the rocket motor case and is connected with the filaments forming wall 10 in keeping with the teaching of the present invention.

With particular reference to FIGURES 2 and 3, rear end fitting 16 is in the form of an annular member having a ring portion 17 with a plurality of circumferentially spaced outwardly extending radial bosses 18. An outer annular member is illustrated in the preferred embodiment in the form of a circumferentially extending series of arcuate segments 19 encasing ring 17. The segments are suitably interlocked with the fitting, and each have a plurality of holes 19a, in the illustrated embodiment three holes, one receiving each of the bosses 18 with a snug fit for effectively preventing longitudinal movement between the segments and fitting.

Longitudinal filaments 11 extend between ring 17 and the series of segments 19 and have return portions 20 overlying the outer circumferential surfaces of the segments. These return portions are against the rear edges of the segments. A circumferential winding 21 is tightly wound about return portions 20 for tightly clamping the return portions on the series of segments 19. As illustrated in the drawings, a thrust ring 22 is secured about the rear end of the case, in any suitable manner as by circumferential winding 22'.

Thus, loads applied to the rocket motor case wall 10 are transmitted through longitudinal filaments 11 to end fitting 16 by tension stress in the longitudinal filaments. More particularly, the rear ends of longitudinal filaments 11 are firmly secured to segments 19 by their return portions 20 which are tightly clamped to the segments by circumferential filaments 21. Segments 19 are firmly interlocked with bosses 18 of fitting 16 for transmitting the load on wall 10 to the fitting.

Figure 7:
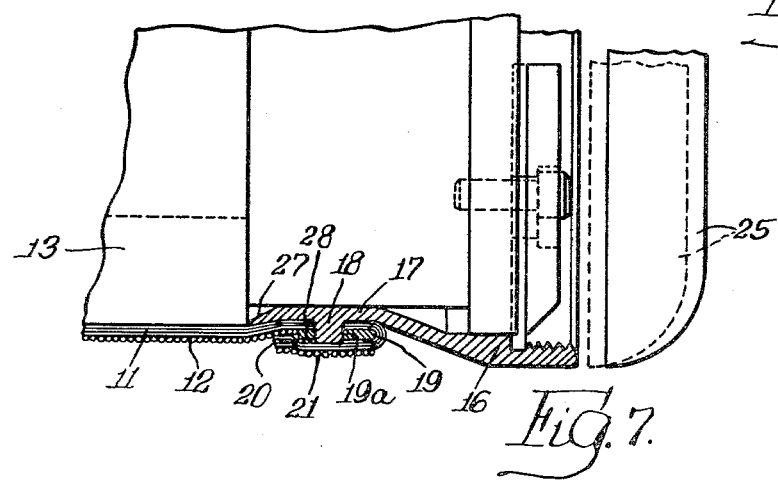
FIGURE 7 is an enlarged, fragmentary side view similar to FIGURE 6, illustrating a subsequent step in the fabrication of the rocket motor case, with parts broken away and removed for clearer illustration.

In the illustrated embodiment the rear end nozzle attachment fitting 16 and the rocket motor case are connected during fabrication of the case. As may best be seen in FIGURES 6 and 7, the fitting is suitably releasably secured to the rear end of removable mandrel 13, and a dummy rear end fixture 25 is removably secured to the open rear end of the fitting. As illustrated in FIGURE 4, longitudinal filaments 11 are wound around mandrel 13, front end fitting 14, rear end fitting 16, and fixture 25. Longitudinal filaments 11 extend across the outer faces of bosses 18 on rear end fitting 16. Filaments 11 are generally parallel to the longitudinal axis of the rocket motor case, but as illustrated in FIGURE 4, filaments 11 are received in and bend around an undercut portion 15 of front end fitting 14, and at the rear end of the case longitudinal filaments 11 bend around a cylindrical boss 26 of fixture 25, so that these filaments are slightly askew of the longitudinal axis of the rocket motor case. It should be understood that for the purposes of this invention the precise direction of longitudinal filaments 11 is not critical, but they should preferably be as near to parallel with the longitudinal axis of the case as is practical. Any suitable number of layers of longitudinal filaments 11 may be laid, and in the preferred embodiment there are four layers.

Figures 5, 6:
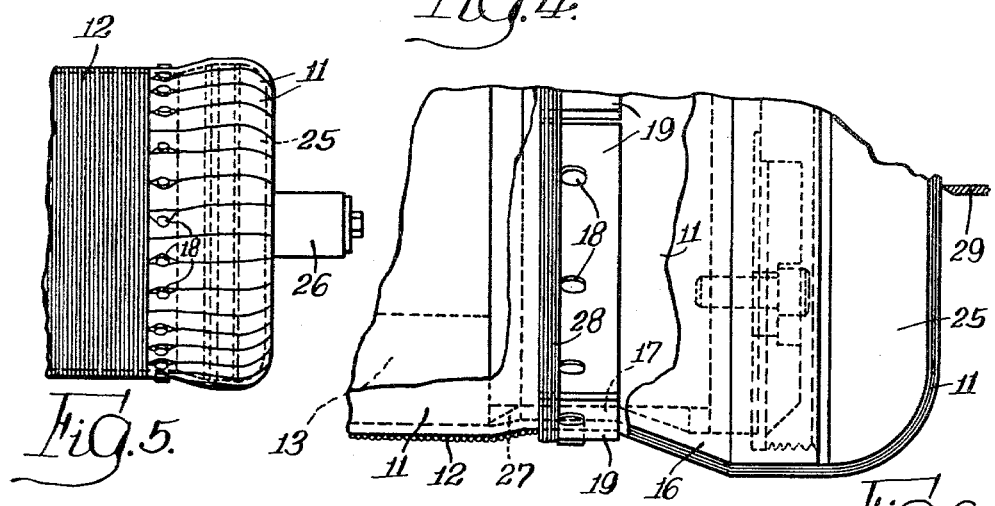
FIGURE 5 is a fragmentary side view illustrating a subsequent step in the fabrication of the rocket motor case.
FIGURE 6 is an enlarged, fragmentary side view illustrating a subsequent step in the fabrication of the rocket motor case, with parts broken away for clearer illustration.

After the longitudinal filaments 11 have been wound, circumferential filaments 12 are wound about the longitudinal filaments, as may best be seen in FIGURES 4 and 5. It is not necessary that circumferential filaments 12 be precisely normal to the longitudinal axis of the rocket motor case, but they must be substantially transverse to the longitudinal filaments 11, in keeping with suitable bi-axial winding techniques. Circumferential filaments 12 are tightly wound about the forward end of ring 17 for tightly clamping longitudinal filaments 11 on the ring. During this portion of the circumferential winding operation the longitudinal filaments are positioned around bosses 18, so that the bosses extend outwardly from the longitudinal filaments. It should be noted that fitting 16 has an outwardly and forwardly inclined flange 27 at its forward end for more securely interlocking the filaments and fitting.

Segments 19 are positioned about the rear end of the rocket motor case and receive bosses 18 in holes 19a, as previously described. These segments are arranged in a circumferential series and define an annular member or ring extending around rocket motor case and encircling ring 17 and longitudinal filaments 11. Means for retaining the segments properly in place on bosses 18 is illustrated in the drawings in the form of circumferential filaments 28 tightly wound about the series of segments 19. Longitudinal filaments 11 are severed, in any suitable manner as by cutting with a blade 29, rearwardly of segments 19 a sufficient distance so that the free ends of longitudinal filaments 11 may be folded forwardly across the outer face of the segments and pulled tightly against the rear edges of the segments, thereby forming longitudinal filament return portions 20. These return portions are now tightly wound with circumferential filaments 21 for tightly clamping the return portions 20 against the segments and securing fitting 16 to longitudinal filaments 11. Thus, when a load, such as high pressure, is applied to the rocket motor case, the longitudinal filaments 11 are tensioned in applying their load to segments 19, and the segments in turn transmit the load to fitting 16. After circumferential filaments 21 have been secured in place, in any suitable manner, as by suitable bonding material, the free ends of return portions 20 and any excess circumferential filament 21 may be trimmed.

I claim:

1. A generally cylindrical bi-axial filament wound rocket motor case comprising: a generally annular end fitting having a ring with a plurality of circumferentially spaced outwardly extending radial bosses; at least one layer of generally coaxial filaments extending generally longitudinally across the outer surface of said ring and around said bosses with said bosses extending outwardly past said filaments; at least one layer of generally coaxial filaments generally transverse to the first said filaments and tightly wound around the longitudinal filaments and circumferentially around said ring; a circumferential series of segments tightly encasing said ring and portions of the longitudinal filaments adjacent said ring and having openings, one snugly receiving each of said bosses; at least one layer of filaments generally transverse to the first said layer and tightly wound circumferentially around said series of segments for tightly clamping said segments on the inner filament and fitting; return portions on the first said filaments, said return portions overlying and tightly encasing said series of segments; and at least one layer of filaments generally transverse to the first said filaments and tightly wound about said return portions for tightly clamping said return portions about said series of segments and securing said fitting to the first said filaments, whereby the first said filaments are tensioned in transmitting their load to said segments and said segments transmit said load to said fitting.

2. A generally cylindrical bi-axial filament wound case comprising: a fitting including a rigid ring having outwardly extending radial bosses; at least one filament layer extending generally longitudinally of and across the outer surface of said ring with said bosses extending outwardly past said filaments; at least one filament layer extending tightly around the longitudinal filaments and generally circumferentially around said ring; a series of rigid segments extending circumferentially of and tightly encircling said ring and filaments, said segments having openings, one snugly receiving each of said bosses; at least one layer of filaments extending circumferentially of and tightly around said series of segments; return portions on the longitudinal filaments, said return portions overlying and tightly encasing said series of segments; and at least one filament layer extending tightly around said return portions and generally circumferentially of said series of segments.

3. A bi-axial filament wound rocket motor case comprising: a generally annular end fitting having a plurality of circumferentially spaced outwardly extending radial bosses; a generally annular member encasing said fitting and having openings, one receiving each of said bosses; at least one layer of filaments extending generally longitudinally between said fitting and said annular member, said filaments having return portions overlying said annular member; and at least one layer of filaments generally transverse to the first said filaments and tightly wound about said return portions and annular member for tightly clamping said return portions about said annular member and securing said fitting to the first said filaments.

4. A filament wound case comprising: a rigid ring having outwardly extending radial bosses; at least one filament layer extending generally longitudinally of and across the outer surface of said ring; a series of rigid segments encircling said ring and filaments, said segments having openings, one snugly receiving each of said bosses; return portions on said filaments, said return portions overlying said segments; and at least one filament layer extending circumferentially of said return portions and series of segments for holding said return portions about said segments and securing said ring to the first said filaments.

5. A filament wound case having a bonded filament wall and an end fitting providing a maximum opening to the interior of the case comprising: a rigid ring having outwardly extending radial bosses; at least one filament layer extending generally longitudinally of and across the outer surface of said ring; a series of rigid segments encircling said ring and filaments, said segments and ring defining an end fitting, said segments having openings, one snugly receiving each of said bosses; return portions on said filaments, said return portions overlying said segments; means bonding said filaments together to make a solid mass of material engaging said bosses; and at least one filament layer extending circumferentially of said return portions and series of segments for holding said return portions about said segment and securing said ring to the first said filaments.

References Cited in the file of this patent

FOREIGN PATENTS

| | | |
|---|---|---|
| 303,791 | Great Britain | May 16, 1929 |
| 640,104 | France | Mar. 24, 1928 |